United States Patent [19]

Onishi

[11] Patent Number: 4,821,831
[45] Date of Patent: Apr. 18, 1989

[54] THROTTLE CONTROL DEVICE

[75] Inventor: Masayoshi Onishi, Hyogo, Japan

[73] Assignee: Mitsubishi Denki Kabushiki Kaisha, Tokyo, Japan

[21] Appl. No.: 164,748

[22] Filed: Mar. 7, 1988

[30] Foreign Application Priority Data

Mar. 12, 1987 [JP] Japan .................................. 62-59147

[51] Int. Cl.$^4$ ............................................. B60K 31/02
[52] U.S. Cl. .................................... 180/178; 180/197; 123/361; 74/513; 74/665 C
[58] Field of Search ................ 180/178, 197; 123/361, 123/396; 74/513, 661, 665 A, 665 C, 847

[56] References Cited

U.S. PATENT DOCUMENTS

| | | | |
|---|---|---|---|
| 1,368,282 | 2/1921 | Muzzy | 180/178 |
| 2,565,968 | 8/1951 | Jorgensen et al. | 123/352 X |
| 3,802,528 | 4/1974 | Leiber | 180/197 X |
| 4,526,060 | 7/1985 | Watanabe | 74/513 X |

FOREIGN PATENT DOCUMENTS

| | | | |
|---|---|---|---|
| 3143666 | 5/1983 | Fed. Rep. of Germany | 180/197 |
| 0128431 | 8/1983 | Japan | 123/361 |

Primary Examiner—Charles A. Marmor
Assistant Examiner—Brian L. Johnson
Attorney, Agent, or Firm—Sughrue, Mion, Zinn, Macpeak and Seas

[57] ABSTRACT

A throttle control device includes a first gear 5 rotatable corresponding to the depression of an accelerator pedal 1 of a vehicle engine a first motor 8 engaged with a second gear 6 meshed with the first gear, the first motor being actuated upon a traction slip detection to rotate the first gear through the second gear to thereby correct the rotation angle of the first gear. A third gear 12 is ganged with the first gear to rotate therewith, and a throttle link 20 is coupled with the third gear for controlling the opening of a throttle valve 22 of the engine through a throttle wire 19 corresponding to a rotation angle of the third gear, and a second motor 18 drives the third gear through a clutch to control the opening of the throttle valve during a constant speed running of the vehicle.

1 Claim, 1 Drawing Sheet

THROTTLE CONTROL DEVICE

BACKGROUND OF THE INVENTION

The present invention relates to a throttle control device having an accelerator operating system, a throttle operating system and a motor drive system, and capable of being switched between a stationary running conrol system and a traction control system.

A conventional traction control in a start control of an automobile is performed by, for example, returning an accelerator when a slip occurs, reducing a throttle opening by means of a constant speed running device and/or restricting tire slip by means of anti-skin brake control.

In order to perform a start control of an automobile smoothly, it is preferred to use the throttle control and the slip restriction control mentioned above, in combination. However, in the past, these controls are performed separately.

SUMMARY OF THE INVENTION

An object of the present invention is to provide a throttle control device which is capable of being switched between normal running, traction control and constant speed running control, in sequence, and of performing the traction control and the constant speed running control, separately, by means of two motors and two clutches.

The throttle control device according to the present invention comprises a first gear whose revolution is proportional to an amount of depression of an accelerator pedal, a first motor operably connected to a second gear meshing with the first gear, a third gear ganged with the first gear, a throttle link for controlling an opening of a throttle valve according to a revolution angle of the third gear, and a second motor for driving the third gear.

In the present invention, the first gear revolves by an angle corresponding to the amount of depression of the accelerator pedal in normal running condition, so that the third gear meshed therewith revolves by a corresponding angle, upon which the throttle link controls the opening the throttle valve. In the traction control, when a slip condition is detected, the first motor revolution is transmitted through the second gear to the first gear to correct the revolution angle thereof. In the constant speed running, the second motor revolution is transmitted to the third gear which in turn is transmitted through the throttle wire to the throttle link to control the opening of the throttle valve so that it is porportional to a deviation of vehicle speed to make the deviation zero and maintain the throttle opening thereat.

BRIEF DESCRIPTION OF THE DRAWING

The single figure shows an embodiment of the present invention schematically.

DETAILED DESCRIPTION OF THE PREFERRED EMBODIMENT

Figure 1:
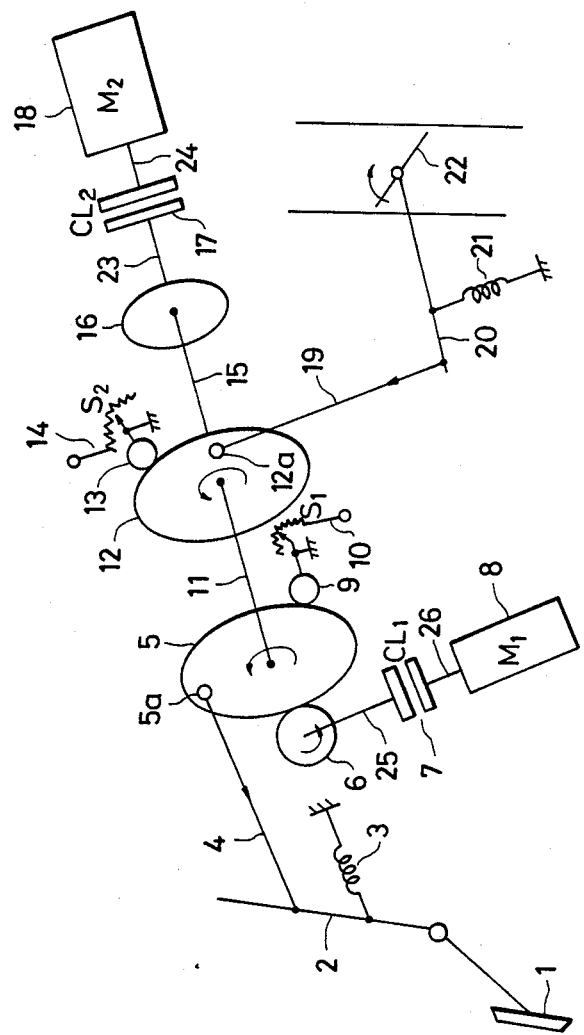

A preferred embodiment of the present invention will be described with reference to the single figure.

In the figure, one end of an acceleration link 2 is connected to an acceleration pedal 1. One end of a first return spring 3 is connected to the acceleration link 2 and the other end of the return spring 3 is fixed to an anchoring end. The first return spring 3 biases the acceleration link 2 to an initial or idle position thereof.

One end of an acceleration wire 4 is also connected to the acceleration link 2. The other end of the acceleration wire 4 is connected to a predetermined position 5a on an outer periphery of a first gear 5.

A second gear 6 meshes with the first gear 5. An output shaft 25 of the second gear 6 is connected through a first clutch 7 to an output shaft 26 of a first motor 8.

An output shaft 11 of the first gear 5 is connected to a third gear 12 having an output shaft 15 which is connected to a sixth gear 16. An output shaft 23 of the sixth gear 16 is connected through a second clutch 17 to an output shaft 24 of a second motor 18.

A fifth gear 9 meshes with the first gear 5. An acceleration opening sensor 10 is directly connected to the fifth gear 9.

Similarly, a fourth gear 13 meshes with the third gear 12. A throttle opening sensor 14 is directly connected to the fourth gear 13.

A throttle link 20 is connected through a throtle wire 19 to a predetermined position 12a on an outer periphery of the third gear 12.

The throttle link 20 is connected to a throttle valve 22 disposed within a suction tube of an engine intake manifold. One end of a second return spring 21 is connected to the throttle link 20 and the other end of the spring 21 is fixed stationarily. The second return spring 21 biases the throttle valve 22 to a normally closed or idle state.

An operation of this device in each of an initial condition, a normal running condition, a traction control condition and a constant speed running condition will be described below.

(1) Initial Condition

In the initial condition, the acceleration link 2 and the throttle link 20 are kept in their initial positions by the first and second return springs 3 and 21, respectively.

(2) Normal Running Condition

When the acceleration pedal 1 is depressed during the normal running condition, the acceleration wire 4 connected to the acceleration link 2 is shifted leftwardly to rotate the first gear 5 in the direction of the arrow. At the same, the third gear 12 is rotated in the same arrow direction to move the throttle wire 19 connected to the third gear 12 upwardly. Therefore, the throttle valve 22 is rotated in a reverse direction through the throttle link 20, so that the throttle opening is controlled in proportion to the amount of depression of the acceleration pedal 1 and thus the vehicle speed is controlled correspondingly to the throttle opening.

In this mode, the first and second motors 8 and 18 and the first and second clutches 7 and 17 are kept in off states, respectively, to thereby exclude drive controls by means of external motors.

(3) Traction Control

In, for example, a manual start condition, when a slip occurs due to a fast depression of the accelerator pedal 1, a slip detector of a brake control device (not shown) is actuated to detect the fact and provides a detection signal upon which the first motor 8 and the first clutch 7 are actuated to transmit a torque through the second gear 6 to the first gear 5 to thereby correct the revolution angle thereof.

In this case, there may be the following control flow:

(i) Firstly, the throttle opening is controlled to reduce it from the initial opening value.

(ii) When the slip detection signal terminates, the first motor 8 is driven in the reverse direction to control the throttle opening to increase it.

(iii) After the throttle opening is recovered to its initial condition, the traction control is terminated.

Upon the termination of the traction control, the first motor 8 and the first clutch 7 are turned off. In this case, an output S1 of the accelerator opening sensor 10 is as follows:

$$\text{Traction Start, } S1 = SO \tag{1}$$

$$\textit{Traction Control, } S1' = SO - \Delta S \tag{2}$$

$$\text{Traction End, } S1'' = SO \tag{3}$$

where
SO: Initial Throttle Opening
ΔS: Control Opening Change (Width)

(4) Constant Speed Running Control

In this mode of operation, commonly termed "cruise control", the second motor 18 and the second clutch 17 are turned on. Therefore, the motor torque is transmitted through the output shaft 23 of the sixth gear 16 to the third gear 12, so that the opening of the throttle valve 22 is controlled through the throttle wire 19 and the throttle link 20.

The throttle opening is controlled in proportion to a deviation of vehicle speed and the set constant speed running is maintained by rotating the throttle opening to a value at which the deviation becomes zero.

An output S2 of the throttle opening sensor 14 is as follows:

$$\text{Constant Speed Running Start } S2 = SO \tag{4}$$

$$\textit{Constant Speed Control } S2' = SO - \Delta S \tag{5}$$

$$\textit{Constant speed Running End } S2'' = SO' \simeq SO \tag{6}$$

where SO is the Aimed Opening, SO' is the Control Opening, and ΔS is the Control Width.

As mentioned hereinbefore, according to the present invention, the opening control of the throttle valve during the normal running condition is performed through the throttle link by rotating the first and third gears corresponding to the amount of depression of the acceleration pedal. In the traction mode, the revolution angle of the first gear is corrected through the second gear by the first motor and, in the constant speed running, the second motor drives the third gear to control the throttle opening in proportion to the deviation of the vehicle speed to hold the throttle opening at the value at which the deviation is zero. Therefore, it is possible to sequentially switch the control mode between normal running, traction control and constant speed running so that traction control and constant speed running can be done separately, resulting in a high response and superior controllability.

What is claimed is:

1. A throttle control device, comprising: a first gear (5) operably coupled to an accelerator pedal (1) of a vehicle engine for rotation corresponding to the amount of depression of said pedal, a first motor (8) engageable through a first clutch (7) with a second gear (6) meshed with said first gear, said first motor being actuated upon a traction slip detection to rotate said first gear through said second gear to correct a rotation angle of said first gear, a third gear (12) ganged with said first gear to rotate therewith, a throttle link (20) coupled to said third gear by a throttle wire (19) for controlling an opening angle of a throttle valve (22) of said engine corresponding to a rotation angle of said third gear, and a second motor (18) for driving said third gear through a second clutch (17) to control the rotation angle of the third gear and attendantly the opening angle of said throttle valve during a constant speed running mode of the vehicle.

* * * * *